No. 752,388. Patented February 16, 1904.

UNITED STATES PATENT OFFICE.

ARTHUR EICHENGRÜN, OF ELBERFELD, AND ADOLF BRAUN, OF MÜLHAUSEN, GERMANY, ASSIGNORS TO FARBENFABRIKEN OF ELBERFELD CO., OF NEW YORK, N. Y., A CORPORATION OF NEW YORK.

SENSITIVE PHOTOGRAPHIC EMULSION.

SPECIFICATION forming part of Letters Patent No. 752,388, dated February 16, 1904.

Application filed April 14, 1903. Serial No. 152,593. (No specimens.)

*To all whom it may concern:*

Be it known that we, ARTHUR EICHENGRÜN, doctor of philosophy, chemist, residing at Elberfeld, and ADOLF BRAUN, photochemist, residing at Mülhausen, Alsace, Germany, (assignors to the FARFENFABRIKEN OF ELBERFELD CO., of New York,) have invented a new and useful Improvement in a New Sensitive Photographic Emulsion; and we hereby declare the following to be a clear and exact description of our invention.

We have found that such acetylized derivatives of cellulose as are soluble in alcohol—
*e. g.*, the acetyl derivatives of cellulose soluble in alcohol which is described in United States Letters Patent No. 734,123, dated July 21, 1903—can be employed with great success for the preparation of new photographic emulsions sensitive to light and suitable for the manufacture of photographic plates, papers, films, or the like. The papers, for instance, coated with these emulsions possess a great brilliancy, a fine grain, and a good resistance to external influences. They are stable and will not become hard and brittle.

In carrying out the new process practically we can proceed as follows, the parts being by weight: A solution of three parts of magnesium chlorid and 1.5 parts of nickel chlorid dissolved in forty parts of water is mixed with sixty parts of alcohol. This solution is added to one thousand parts of a two-per-cent. alcoholic solution of the acetylized derivative of cellulose described in United States Letters Patent No. 734,123, dated July 21, 1903.

After having been stirred for some time the two following solutions are added with stirring: first, a solution of twenty parts of silver nitrate in forty parts of water mixed with sixty parts of alcohol and then a solution of five parts of citric acid in forty parts of water and mixed with sixty parts of alcohol. When the mixture has become homogeneous, it is filtered. The filtered liquid can then be employed for coating glass plates, papers, celluloid plates, or the like.

Instead of the above-cited cellulose acetate other acetyl derivatives of cellulose soluble in alcohol may be employed. Of course the above example can be varied within wide limits without altering thereby this invention.

Having now described our invention, what we claim is—

In a photographic sensitive emulsion the new composition of matter being a combination of a photographically-sensitive substance with alcohol-soluble acetylized derivatives of cellulose substantially as hereinbefore described.

In testimony whereof we have signed our names in the presence of two subscribing witnesses.

ARTHUR EICHENGRÜN.
ADOLF BRAUN.

Witnesses to signature of Arthur Eichengrün:
   OTTO KÖNIG,
   ALBERT HEMSING.

Witnesses to signature of Adolf Braun:
   CHRISTIAN WEILBRENNER,
   BENJAMIN F. LIEFIELD.